May 12, 1970     J. F. MORSE     3,511,117

SINGLE LEVER CONTROL UNIT

Filed Aug. 27, 1968     6 Sheets-Sheet 6

INVENTOR.
JOHN F. MORSE
BY Hamilton, Cook,
Renner & Kenner
ATTORNEYS

United States Patent Office 3,511,117
Patented May 12, 1970

3,511,117
SINGLE LEVER CONTROL UNIT
John F. Morse, Hudson, Ohio, assignor, by mesne assignments, to North American Rockwell Corporation, Pittsburgh, Pa., a corporation of Delaware
Filed Aug. 27, 1968, Ser. No. 755,575
Int. Cl. G05g 9/08; B63h 21/26; B60k 29/00
U.S. Cl. 74—876                                    11 Claims

ABSTRACT OF THE DISCLOSURE

A single lever control unit for sequentially operating a transmission and throttle and, selectively, for operating the throttle independently of the transmission. During actuation of the transmission it is most desirable that a throttle dwell be maintained, this irrespective of whether the throttle is of the push-to-open or pull-to-open variety and irrespective of the fact that a 45° shift range is provided for the control lever and the transmission actuation member of the unit. This is accomplished by connecting that end of the push-pull throttle control cable casing at the unit to a positioner block movably mounted within the unit. The core of the throttle control cable is attached to a rotatable throttle actuation member, and the positioner block translates the cable casing generally parallel with the connection of the throttle control cable core to the throttle actuation member during the transmission shift in order to preclude relative movement between the core and casing and thereby provide throttle dwell.

BACKGROUND OF THE INVENTION

The present invention relates generally to single lever control units—a mechanical unit for shifting a transmission from neutral into forword or reverse, and vice versa, at, or near, idling speed and, sequentially after shifting into forward or reverse, providing throttle control for the engine operating through the transmission. Such a unit is, of course, as well adapted for operating other devices requiring sequential actuation of dual mechanisms.

Most land vehicles use a shift mechanism merely to select a forward or reverse direction of movement for the vehicle and employ a separate brake to slow, or stop, the vehicle. Marine craft employ a shift mechanism not only to select a forward or reverse direction of movement but also to provide a braking means. Accordingly, the timing involved in the sequential operation of the shift mechanism and throttle becomes far more critical in the operation of marine craft than it does in the operation of land vehicles.

While skilled and highly practiced helmsmen can achieve this critical sequentiality with individual controls for the transmission and throttle, most people have serious difficulties in achieving sufficient proficiency with individual controls to be safe operators even under normal conditions. When faced with a hazardous situation requiring multiple forward and reverse shifts with concomitant openings and closings of the throttle, the average person becomes a menace not only to his own craft but also to any other craft in proximity to his.

The single lever control unit was developed to obviate the necessity for individual controls. As the optimum, a single lever control unit should possess at least the following operational characteristics.

It should provide at least a 45° "shift range." The shift range is the number of degrees through which the control lever moves to effect a shifting into, or out of, gear. The transmission actuation member within a single lever control unit that affects the shift generally moves through a range equivalent to a 45° arc in response to movement of the control lever through a shift range of approximately 30°. Hence, if the shift range is increased to approximately 45° for this same rotation of the transmission actuation members the mechanical advantage between the control lever and the transmission actuation member within the unit is increased. A lesser force will, therefore, be required against the control lever to overcome the resistance, or load, applied against the transmission actuation member. This becomes quite important when shifting the transmission for a high horsepower engine.

It should provide "throttle dwell." Throttle dwell is the ability of the control unit to prevent actuation of the throttle as the control lever is moved through the shift range.

It should provide for full actuation of the throttle beyond the shift range. The number of degrees through which the control lever is movable to actuate the throttle being termed the "throttle range."

It should provide "neutral throttle." Neutral throttle is the ability of the control unit to permit actuation of the throttle while the shifting mechanism is retained in neutral in order to facilitate starting of the engine and to allow the engine to be run at advanced throttle while the boat is at rest.

A wide variety of single lever control units have been devised to provide one or more of these operational characteristics. One of the best known and most highly acclaimed constructions for a single lever control unit employs a throttle actuating arm interconnected to a transmission actuating member by an intermittent, or interrupted, gearing arrangement.

At least the throttle actuating arm is mounted in the control unit to rotate upon rotation of the control lever. Thus, as the control lever is moved from neutral through the shift range the transmission actuating member responds to shift from neutral into either forward or reverse. Continued movement of the single lever control rotates the throttle actuating arm to regulate the throttle.

Although a wide variety of mechanical and/or electrical means are employed to control the shift mechanism in response to movement of the transmission actuating member, motion transmitting means such as a push-pull control cable has generally proven to be excellent for regulating the throttle in response to rotation of the throttle actuating arm.

However, as the throttle actuating arm rotates, arcuate movement of the connection between the throttle actuating arm and the core of the push-pull throttle control cable has been found to induce some displacement to the core with respect to the casing of the control cable. Even though the normal backlash between the core and casing of a push-pull control cable can absorb some of this displacement, a slight advance of the engine throttle may still take place within the shift range.

The prior art has devised a host of constructions to assure the desired throttle dwell. Most frequently a mechanism is employed to swing the connection between the throttle actuating arm and the core of the push-pull control cable about an elongated radius during the shift range to minimize that component of movement by the said connection which results in displacement of the core with respect to the casing, and thereafter about a shortened radius to accentuate that component of movement by the connection. Typical construction utilizing this broad concept are disclosed in my prior U.S. Pats. No. 2,919,772 and No. 2,985,268. U.S. Pat. No. 2,919,772 utilizes a cooperative cam and linkage construction, and U.S. Pat. No. 2,985,268 utilizes multiple links uniquely interconnected.

Another construction utilizes a lost motion connection. A construction utilizing this concept is disclosed in my prior U.S. Pat. No. 2,949,988, wherein the cooperation of a pin received in a slotted aperture occasions a delay in the displacement of the core.

A third construction utilizes a link arm axially to displace the end of the push-pull control cable casing attached to the single lever control unit in an amount to accommodate the axial displacement of the push-pull cable core engendered during rotation of the control lever through the shift range without allowing relative displacement therebetween. A construction employing this concept is disclosed in my prior U.S. Pat. No. 2,966,969.

These constructions work quite well when embodied in control units specifically adapted for given environments. However, the complexity and/or nature of those constructions prevent them from being incorporated in a control unit readily adaptable to a wide variety of environments. As an optimum, a single lever control unit should possess at least the following environmental characteristics.

With respect to a physical presentation of the unit on a marine craft, or the control console thereof, it should be operable with equal facility whether presented from a top or side mounting. The unit should be operable alone for single engine control or should be capable of compound mounting for twin engine control. Moreover, the unit should provide for presentation of the control lever from either the right or left side thereof.

With respect to differences in the operation of various throttle and shift mechanisms the control unit should be as readily adapted for connection with a pull-to-open throttle as a push-to-open throttle.

The control unit should also allow, if a motion transmitting means of the push-pull cable variety is used between the control unit and the shift mechanism, for operation of the shift mechanism irrespective of which gear is actuated by a push of the cable core or which by a pull. The control unit should also be readily adapted to operate electric, mechanical or hydraulic shift mechanisms.

If a push-pull control cable is used to transmit motion between the single lever control unit and the throttle, the control unit should accommodate throttle dwell without binding, or unnecessarily bending, the push-pull control cable.

As an additional consideration a single lever control unit should be readily adapted to permit the inclusion of a "neutral starting device"—i.e., an interlocking mechanism, such as a switch, that prevents operation of the engine starter except when the control lever is in neutral position between the forward and reverse shift ranges.

No concept has been heretofore known whereby a single lever control unit can provide all of the above operational and environmental characteristics.

SUMMARY OF THE INVENTION

It is therefore a primary object of the present invention to provide a construction for a single lever control unit in which all of the aforedescribed operational and environmental characteristics are embodied.

This and other objects which will become apparent from the following specification are accomplished by means hereinafter described and claimed.

In general, a single lever control unit embodying the concept of the present invention is adapted to actuate at least a throttle by a push-pull control cable having a core slidably received within a casing. The control unit is also adapted to actuate the shift mechanism of a transmission sequentially with respect to actuation of the throttle.

A throttle actuation member is mounted in the chassis of the control unit for rotation in response to movement of a control lever. A connecting means attaches the end of the core in the push-pull throttle control cable to the throttle actuation member, and the casing of the throttle control cable is supported on a positioner block.

A transmission actuation member is operatively connected to the throttle actuation member so as to effect shifting of the transmission only through a predetermined range of movement of the control lever in either a forward or reverse direction with respect to neutral—i.e., the shift range.

In order to provide throttle dwell a drive means moves the positioner block during movement of the control lever through the shift range in such a way as to displace the end of the throttle control cable casing generally parallel with, and in the same direction as, the connecting means by which the throttle control cable core is attached to the throttle actuation member. The connecting means is selectively mountable on the positioner block in order that the displacement of the throttle control cable casing during the shift range can accommodate either a push-to-open or a pull-to-open throttle.

A neutral throttle and neutral switch compatible with the concept by which the throttle dwell is accomplished are also provided.

One preferred embodiment of the present invention is shown by way of example in the accompanying drawings and hereinafter described in detail without attempting to show all of the various forms and modifications in which the invention might be embodied; the invention being measured by the appended claims and not by the details of the specification.

DESCRIPTION OF THE PREFERRED EMBODIMENT

Figure 1:
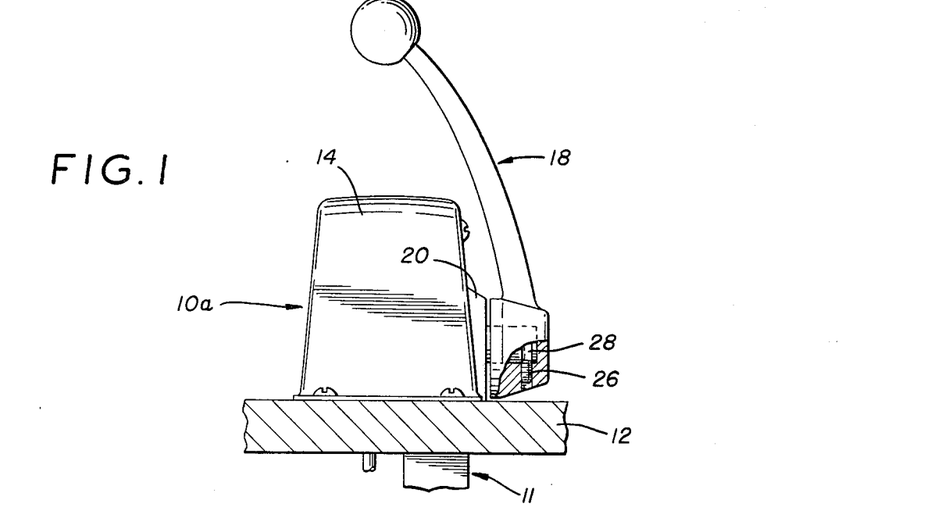
FIG. 1 is a schematic cross section through the top plate of a control console depicting the exposed portion of a single mounted, single lever control embodying the concept of the present invention in side elevation, partly broken away.
Figure 2:
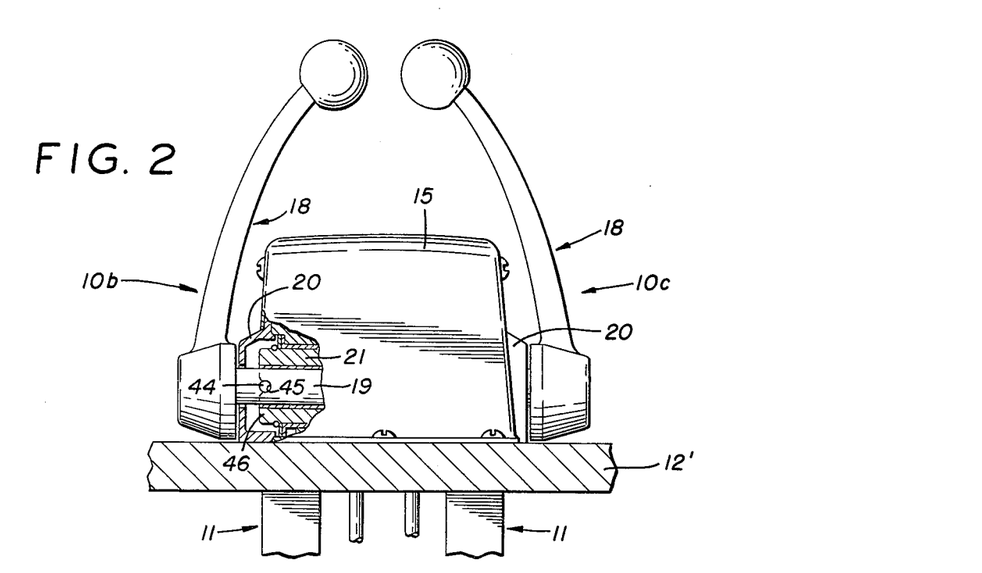
FIG. 2 is a view similar to FIG. 1 depicting twin mounted, single lever control units.

Referring more particularly to the drawings, a single lever control unit, identified generally by the numeral 10, embodying the concept of the present invention has a universal chassis 11 which can be mounted through the horizontal plate 12 of a control console, either singly, as is the control unit 16a depicted in FIG. 1, or in pairs, as are the control units 10b and 10c depicted in FIG. 2. A suitable cap, or hood, 14 covers that portion of the chassis 11 extending above the horizontal plate 12 of the single, top mounted unit 10a depicted in FIG. 1, and a similar, though wider, cap, or hood 15 covers those portions of the chassis 11 of the two control units 10b and 10c extending above horizontal plate 12' in the twin, top mount depicted in FIG. 2.

Figure 3:
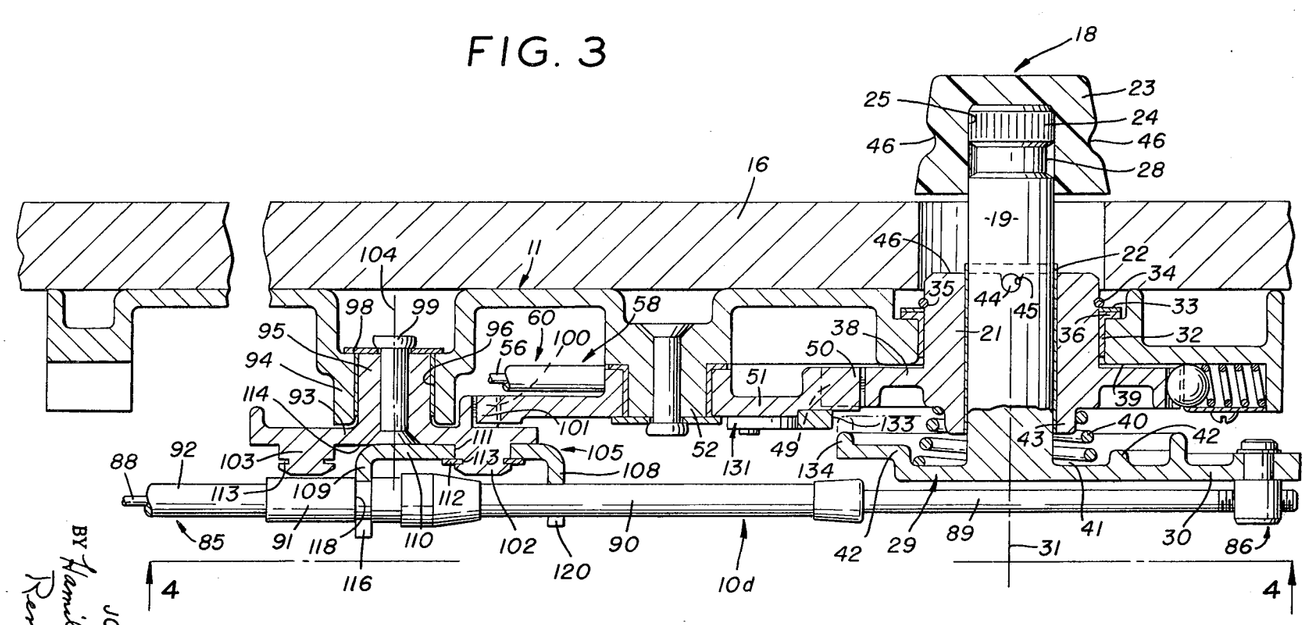
FIG. 3 is a longitudinal cross section, considerably enlarged with respect to FIGS. 1 and 2, through a single lever control unit embodying the concept of the present invention, depicted in a typical side mounted environment.

The same chassis 11 can also be side mounted, as depicted in FIG. 3. For example, the control unit 10d may be fixed behind a mounting panel 16 with only the control lever 18 exposed, as shown. The universal chassis 11 could, as well, itself be mounted on the exposed side of the mounting panel 16 by mounting brackets not shown, in which case a suitable cap, or hood, not shown, would be utilized to cover the exposed mechanism.

The control lever 18 is mounted on the axially outer end of a control shaft 19. The control shaft 19 is preferably of sufficient length to extend through the mounting panel 16 and still present sufficient exposure for secure attachment of the control lever 18. As such, an escutcheon cap 20 may be utilized, as shown in FIGS. 1 and 2, to accommodate and cover the additional length of shaft 19 required for a mounting of the type represented in FIG. 3 when the control unit 10 is either surface or top mounted.

The control shaft 19 is journaled in a drive hub 21 that is, in turn, journaled in the chassis 11. A sleeve bearing 22 is preferably interposed between the shaft 19 and the hub 21.

The control lever 18 has a socket head 23 on one end thereof by which the control lever 18 is attached to the shaft 19. A plurality of axially oriented serrations 24 on the end of the shaft 19 meshingly engage matching serrations 25 on the interior of the socket head 23, and a set screw 26 carried in the socket head 23 is received in an annular groove 28 on the shaft 19. This allows selective positioning of the control lever 18 to provide the most suitable location for the arcuate movement of the control lever 18 through the shift and throttle range, and also allows selective positioning of the control lever irrespective of whether the control unit 10 is to provide a push-to-open (FIGS. 4, 6 and 7) or a pull-to-open (FIGS. 9–11) throttle action, as will be more fully hereinafter described.

The inner end of the shaft 19 presents a throttle actuation member 29 from which extends a radial throttle actuating arm portion 30. The shaft 19 and throttle actuation member 29, including arm portion 30, may be formed integrally, but, in any event, are so constructed as to rotate together in response to rotation of the control lever about the axis 31 of shaft 19.

A flange sleeve bearing 32 between the drive hub 21 and the chassis 11 accomplishes the journaling of drive hub 21 in the chassis 11. A thrust washer 33 abuts sleeve bearing 32 and is secured in position by a snap ring 34 that seats in an annular groove 35 on the outer periphery of the drive hub 21. The flange 36 on sleeve bearing 32 is located on the exterior, or control lever side, of the chassis 11 and is opposed by a gear member 38 on the interior, or opposite, side of the chassis, the gear member extending radially of and being affixed to the drive hub 21.

A spring washer 39 is preferably positioned between the gear member 38 and the chassis 11 to provide a braking friction to the rotation of the drive hub 21. This is especially desirable if the control unit 10 is subjected to vibration or if the mechanisms being operated are in any way spring loaded, as would be the case if a spring governor were provided on the throttle.

A helical spring 40 is retained within a circular recess 41 circumscribed by an annular shoulder 42 extending from the throttle actuation member 29 and surrounds an extension 43 of the drive hub 21. The spring 40 continually urges the throttle actuation member 29 and the drive hub 21 apart to maintain them interlocked for concurrent rotation. This interlocking of the throttle actuation member 29 and the drive hub 21 is selective, however, to provide neutral throttle. Specifically, a pin 44 is retained transversely through shaft 19 with those portions of the pin extending radially beyond the shaft 19 being receivable within a notch 45 across the axially outer edge 46 of drive hub 21. The action of spring 40 biasingly maintains the pin 44 within notch 45, and the pin 44 thereby interconnects the shaft 19 and drive hub 21 to accomplish normally simultaneous rotation of the shaft 19 and the gear member 38 upon rotation of the control lever 18.

Grip recesses 46 are preferably provided on the exterior of the socket head 23 to aid the operator in translating the control lever 18 axially outwardly with respect to the chassis 11, thereby axially sliding the shaft 19 through drive hub 21 against the compression of spring 40 to disengage the pin 44 from notch 45. In this outwardly translated position rotation of the control lever 18 accomplishes rotation of shaft 19 without the attendant rotation of gear member 38. As will be more fully hereinafter explained, this separable rotation not only results in neutral throttle control but also allows adaptation to either push-to-open or pull-to-open throttles. The compression of spring 40 snaps the pin 44 into reengagement with notch 45 when they are aligned.

Figure 4:
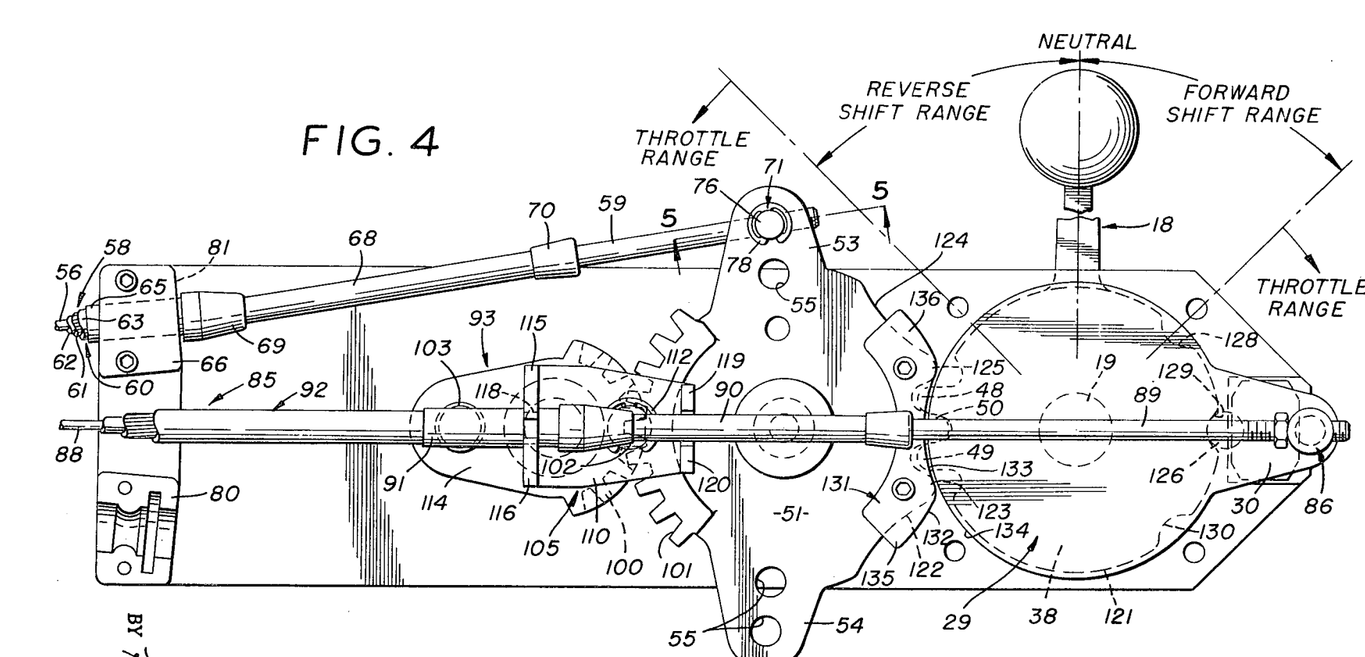
FIG. 4 is a plan view, slightly reduced, of the mechanism incorporated in the subject single lever control unit, taken substantially on line 4—4 of FIG. 3 and depicting the mechanism as oriented when the control lever is in neutral and representing the mechanism of the control disposed to accept a first push-pull control cable for operating a push-to-open throttle and a second push-pull control cable for operating a transmission in which the forward shift is effected by a push.

Teeth 48 and 49 (FIG. 4) on the intermittently toothed gear member 38 intermesh, in the neutral position depicted in FIG. 4, with the tooth 50 on the intermittently toothed transmission actuation member 51 that is mounted for rotation on a stub shaft 52 (FIG. 3) extending from the chassis 11. With the radius of the transmission actuation member 51 being substantially equal to the radius of the gear member 38 a 45° rotation of the control lever 18 will result in a 45° rotation of the transmission actuation member 51.

The transmission actuation member 51 is provided with two oppositely extending throw arms 53 and 54, each of which is provided with at least one connecting means, such as aperture 55, adapted for fastening the core 56 of a push-pull control cable, or other suitable motion transmitting means, 58 to the selected throw arm 53 or 54. One end of the transmission control cable core 56 is connected, by the end rod 59 depicted, to a throw arm, as more fully hereinafter described, and the opposite end is operatively attached to the shift mechanism of a remote transmission, not shown.

The push-pull control cable 58 may be of any conventional construction having a core 56 reciprocally slidable within a casing 60 to transmit mechanical motion by the application of either tensile or compressive forces to the core 56. In the exemplary construction depicted, the casing 60 is formed of a plurality of casing wires 61 laid contiguously, in the form of a long pitched helical coil, about the radially outer surface of an inner, flexible, plastic tube 62 that extends the full length of the casing 60. An outer, flexible cover 63 encases the coil of wires 61 up to within a short distance from the ends thereof.

An end fitting 65 is positioned over the end of the cable casing 60 and is cold swaged, or otherwise suitably connected, onto the exposed portion of the cylindrical grouping of wires 61. A plurality of annular ribs, not shown, may be provided within the fitting 65, which, when crimped onto the cover 63, effect a seal between the end fitting 65 and the cover 63.

A retaining notch, not shown, is provided on the exterior of the fitting 65 for engagement by a screw mounted bracket 66 whereby the cable casing 60 is secured to the chassis 11.

An extension tube 68 is swivelly mounted on the fitting 65, as by a socket arrangement, not shown. The extension tube 68 slidably receives the end rod 59 which is connected to the end of the cable core 56. The extension tube 68 is closely fitted around the end rod 59 and core 56 to guide the rod 59 and to prevent excessive deflection of that portion of the core 56 sliding therein, particularly when subjected to compressive loads.

Resilient sealing sleeves 69 and 70 are preferably provided at the joint between the end fitting 65 and the extension tube 68, and at the juncture of the end rod 59 and extension tube 68, respectively.

The end rod 59 is selectively connected to one or the other of the clutch control arms 53 or 54, reasons for the selection of which become more fully hereinafter apparent, by a trunnion connector 71.

Figure 5:
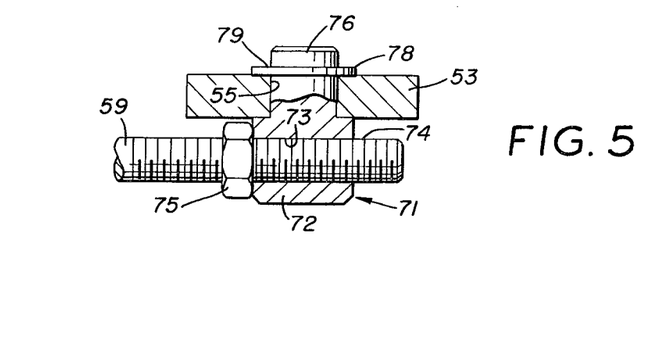
FIG. 5 is an enlarged cross section taken substantially on line 5—5 in FIG. 4.

As best seen in FIG. 5, the trunnion connector 71 has a head portion 72 transversely bored, at 73, to receive the end rod 59. The bore 73 may be threaded matingly to receive corresponding threads 74 on the end rod 59, and a lock nut 75 assures the connection.

An annular stem portion 76 extends coaxially outwardly of the head portion 72 and is rotatably received within an aperture 55 through the selected throw arm 53. A spring clip retainer 78 seats within an annular groove 79 in the stem portion 76 to secure the trunnion connector 71 to the transmission actuation member 51.

Figure 6:
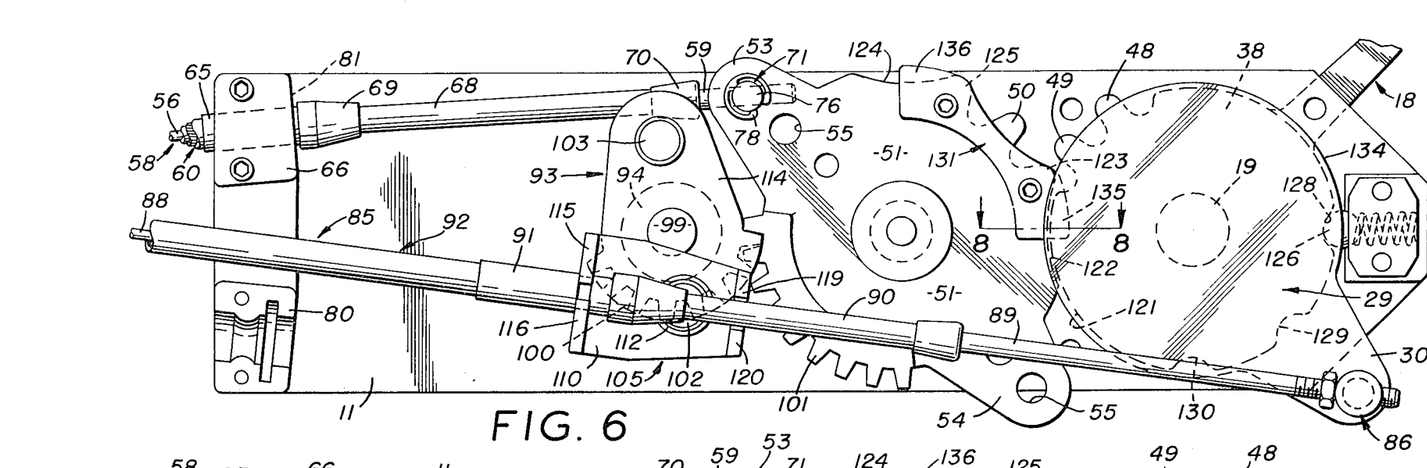
FIG. 6 is a view similar to FIG. 4 depicting the mechanism represented thereby as oriented when the control lever is in the idle forward position—i.e., after having been moved through the shift range.
Figure 7:
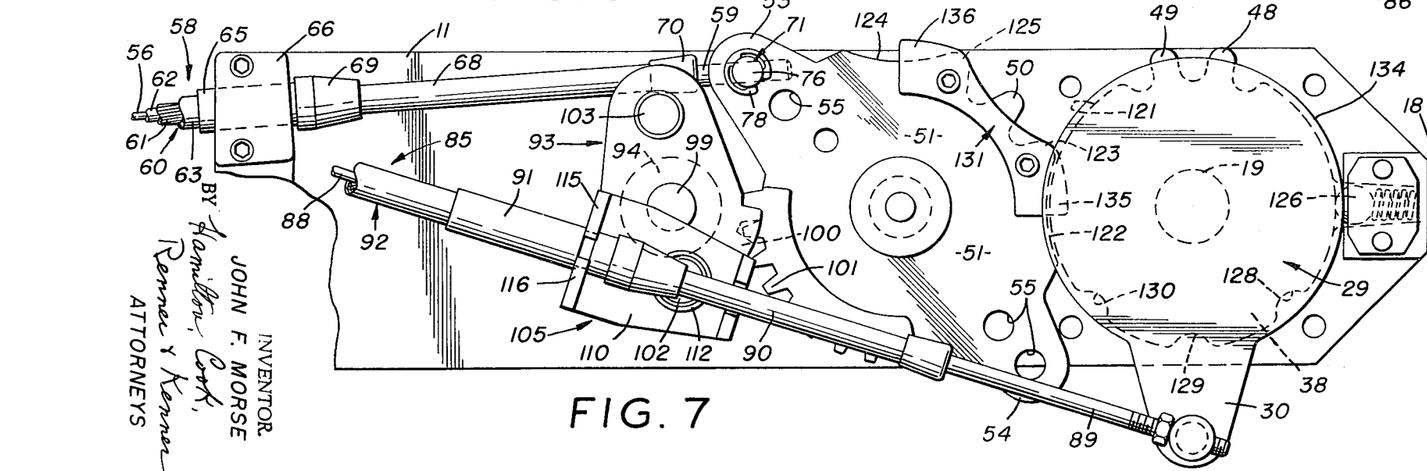
FIG. 7 is a view similar to FIGS. 4 and 6 depicting the mechanism as oriented when the control lever is beyond the idle forward position and within the forward throttle range.

As the control lever 18 is rotated from the neutral position (FIG. 4) through either of the shift ranges, say the forward shift range, to the beginning of the throttle range—i.e., the idle-forward position—as shown in FIG. 6, the resulting rotation of the gear member 38 effects a concurrent rotation of the transmission actuation member 51. With the end rod 59 attached to throw arm 53 the end rod 59 will tend to withdraw from the extension tube 68, thus "pulling" the core 56. Should the shift mechanism of the remote transmission require a "push" of the core 56 to effect a shift from neutral into forward, the end rod 59 would merely be connected to arm 54 of the transmission actuation member 51. In such a situation the end fitting 71 would be mounted in the terminal block 80 on chassis 11 rather than terminal block 81.

It should also be observed that by providing more than one aperture 55 in each arm 53 and 54 a standard 45° rotation of the clutch control member 49 can accommodate the varying length of cable core translation required to operate various shift mechanisms.

During rotation of the control lever 18 through the shift range, the control unit 10 provides throttle dwell by a unique construction. A motion transmitting device such as the push-pull control cable 85 depicted may connect between the remote throttle mechanism, not shown, and the arm portion 30 of the throttle actuation member 29.

The arm portion 30 is adapted to receive a trunnion connector 86 to which the core 88 of the push-pull throttle control cable 85 is attached by an end rod 89 telescopically received within an extension tube 90 that is swivelly mounted in an end fitting 91 secured to the casing 92 of the cable 85, all similar to the corresponding elements of the push-pull transmission control cable 58. The end fitting 91, however, is not fixedly located on chassis 11, as is end fitting 65. Rather, the end fitting 91 is mounted to provide a lateral change in position sufficient to maintain the relative axial position of the end rod 89 with respect to the extension tube 90 so as to prevent relative displacement of the core 88 with respect to the casing 92 while the control lever 18 is being moved through the shift range.

Specifically, the fitting 91 is mounted on a positioner block 93 that moves the fitting in the same direction as, and along a curvilinear path that generally parallels, the curvilinear path followed by the trunnion connector 86, which attaches the end rod 89 to the arm portion 30 of the throttle actuation member 29, as the control lever 18 moves through the shift range. As best seen in FIG. 3, the positioner block 93 is pivotally mounted on a bearing boss 94 extending from the chassis 11. The positioner block 93 has a hub portion 95 that is rotatably received with the annular cavity 96 of bearing boss 94 and is retained therein by a washer 98 and mounting rivet 99.

Gear teeth 100 on the positioner block 93 mesh with corresponding gear teeth 101 on the transmission actuation member 51 so that rotation of the throttle actuation member 29 in response to movement of control lever 18 through the shift range—and thereby rotation of the transmission actuation member 51—rotates the positioner block 93.

A pair of opposed studs 102 and 103 extend outwardly of the positioner block 93, one from each side of the pivotal axis 104 thereof. Securing means in the nature of an anchor clip 105 mounts the end fitting 91 of the push-pull throttle control cable 85 to one or the other of the studs 102 or 103, depending upon whether the throttle is a push-to-open or a pull-to-open variety.

For example, in the arrangement depicted in FIG. 4 the arm portion 30 of throttle actuation member 29 is oriented such that rotaton of the control lever 18 through either the forward or the reverse throttle range will "push" the core 88. As the arm portion 30 moves to either side of the neutral position depicted in FIG. 4 the positioner block 93 must move the end fitting 91 in the same direction to prevent relative axial displacement of the core 88 with respect to the casing 92 through the shift range. Accordingly, the anchor clip 105 is mounted on stud 102 when the arm portion 30 of the throttle actuation member 29 is oriented for actuating a push-to-open throttle. That is, the stud on which the anchor clip 105 is mounted has the same locational relationship with respect to the pivotal axis 104 of the positioner block 93 as the connection of the end rod 89 and the arm portion 30 has to the pivotal axis 31 of the throttle actuation member 29—as shown in FIG. 4 both are to the right of their respective pivotal axes.

The anchor clip 105 itself is preferably U-shaped, having a front flange 108 and a rear flange 109 connected by a web 110. The web 110 has a bore 111 that is rotatably receivable on either stud 102 or 103, and the anchor clip 105 is retained on the selected stud by a spring clip 112 that seats within an annular groove 113 in the respective stud. The web 110 of anchor clip 105 slidingly engages the face 114 of the positioner block 93 so that the anchor clip 105 is freely rotatable about either stud.

The rear flange 109 of anchor clip 105 includes a pair of spaced fingers 115 and 116 which are adapted to be received within an annular groove 118 in the end fitting 91 and bent toward each other to fasten the fitting 91 to the anchor clip 105.

The front flange 108 is provided with a pair of spaced abutments 119 and 120 defining a crenel through which the extension tube 90 extends. The end fitting 91 is received in anchor clip 105 such that the piovtal axis of the extension tube 90 within end fitting 91 is substantially coincident with the pivotal axis of the anchor clip 105 about the selected stud 102 or 103 on which the anchor clip is carried.

With the casing 92 of the push-pull throttle control cable 85 so mounted a throttle dwell is provided through either shift range. Continued rotation of the control lever 18 beyond the shift range—into the throttle range—unmeshes the teeth 48 and 49 on the gear member 38 from the tooth 50 on the transmission actuation member 51. When the teeth thus unmesh at the end of the forward shift range, as depicted in FIG. 6, the circular edge 121 of the gear member 38 engages the arcuate face 122 circumferentially of the shoulder 123 on transmission actuation member 51. Thus interlocking means between the gear member 38 and the transmission actuation member 51 maintains the transmission actuation member 51 fixedly positioned and precludes the transmission from being shifted out of forward gear so long as the control lever 18 is within the forward throttle range. A similar arcute face 124 is provided cirmumferentally of shoulder 125 for engagement by the circular edge 121 of the gear member 38 when the control lever has been oppositely rotated beyond the reverse shift range into the reverse throttle range.

With the transmission actuation member 51 thus fixed the positioner block 93 also remains stationary so that rotation of the control lever 18 into and through the throttle range (FIG. 7) will force the end rod 89 into the extension tube 90 and thereby "push" the core 88 with respect to the casing 92 to open the throttle. Reverse rotation of the control lever 18 through the throttle range reverses the movement of the core 88 with respect to casing 92 and thereby closes the throttle.

To provide a tactile position indicator to the operator, a spring biased ball 126 is received: within detent notch 128 in the circular edge 121 of the gear member 38 at the idle forward position; within detent notch 129 at the neutral position; and, within detent notch 130 at the idle reverse position.

Reverse rotation of the control lever 18 from the idle forward position toward the neutral position brings the teeth 48 and 49 on gear member 38 into meshing engagement with the tooth 50 on transmission actuation member 51 to shift the transmission from forward to neutral, again with throttle dwell.

To shift from forward into reverse the control lever 18 is rotated through the reverse shift range, but inasmuch as all parts simply move in reverse of their movement through the forward shift range and forward throttle range no additional description is required.

Should the operator desire to open the throttle independently of the shift function he moves the control lever 18 to the neutral position and grasps the recesses 46 in the socket portion 23 of the control lever 18 with his fingers and translates the control lever axially outwardly against the biasing action of spring 40 a distance sufficient to disengage pin 44 from notch 45. After slight rotation of the control lever 18 about axis 31 to move the pin 44 circumferentially away from the notch 45, the socket portion 23 may be released and the pin 44 will ride on the axially outer edge 46 of the drive hub 21.

To preclude an accidental shift while the neutral throttle is being utilized, an interlocking plate 131 is secured to the trasmission actuation member 51 axially of the tooth 50 and shoulders 123 and 125. The interlocking plate 131 has a generally arcuate outer edge 132 that is interrupted by a reversely curved portion 133. In neutral position the reversely curved portion 133 is concentric with an annular blocking flange 134 on the periphery of the throttle actuation member 29 and is of only slightly larger radiu While the interlocking plate 131 and the blocking flange 134 are normally axially offset (the solid line representation in FIG. 3), when the pin 44 rides on the edge 46 of the drive hub 21, the reversely curved portion 133 is juxtaposed to the blocking flange 134 (the chain-line representation in FIG. 3). Because of this interaction of the blocking flange 134 and the reversely curved portion 133, the drive hub 21 is locked in neutral position and the control lever 18 can be moved arcuately to advance the throttle independently of the shift function.

Figure 8:
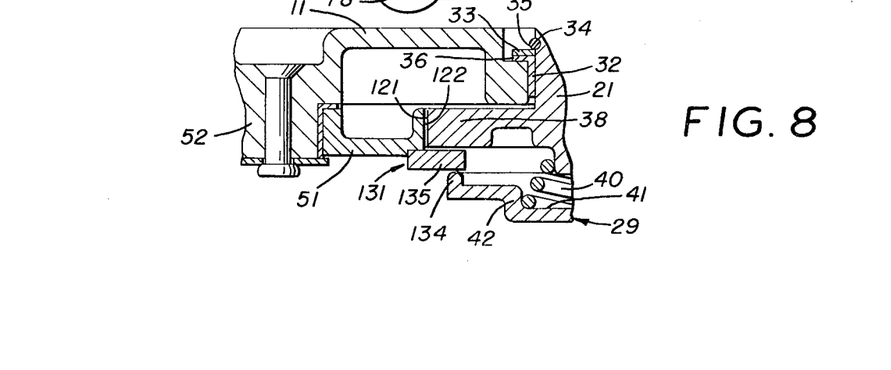
FIG. 8 is an enlarged cross section taken substantially on line 8—8 of FIG. 6.

It must be observed that an interlocking means not only prevents the shift function from being affected during neutral throttle actuation but an interlock means also prevents disengagement of the pin 44 from notch 45 except when the central lever 18 is in the neutral position. As described above, the interlocking plate 131 is normally offset from the blocking flange 134. In fact, when the pin 44 is engaged with notch 45 the interlocking plate 131 lies in a plane between the plane of the gear member 38 and the plane of the blocking flange 134. Because the interlocking plate 131 is thus normally positioned, upon the slightest rotation of the transmission actuation member 51 away from neutral either the lateral wing 135 or 136 on interlocking plate 131 will be interposed between the blocking flange 134 and the gear member 38. With either of the wings 135 or 136 interposed between the blocking flange 134 and the gear member 38 it is impossible axially to translate the control lever 18 and thereby disengage the pin 44 from notch 45. In this regard see FIG. 8.

It should also be appreciated that the subject control 10 could be adapted to operate a pull-to-open throttle with only minimal adjustment.

To adapt the control unit 10 for a pull-to-open throttle the push-pull throttle control cable 85 would be installed onto the control unit 10 with the anchor clip 105 mounted on stud 103 rather than stud 102. Additionally, the arm portion 30 of the throttle actuation member 29 is reversed 180° from the position in which it is oriented to activate a push-to-open throttle.

Reversal of the arm portion 30 is readily accomplished by disengaging the pin 44 from notch 45, in the same manner as was described to utilize the neutral throttle, and thereafter rotating the control lever 18, and shaft 19, through 180° without changing the position of the drive hub 21, at which point the pin 44 re-engages the notch 45 and the arm portion 30 is reversed. The control lever 18 is easily removed from control shaft 19 and reoriented, as desired, merely by loosening the set screw 26 and sliding the socket head 23 off the serrated end of shaft 19. After the control lever 18 has been reoriented to provide the desired location for its rotation, the socket head 23 is repositioned on the shaft 19 and the set screw 26 tightened. With the end rod 89 connected to arm portion 30, as depicted in the alternate neutral position (FIG. 9), pull-to-open throttle actuation is obtained.

Figure 9:
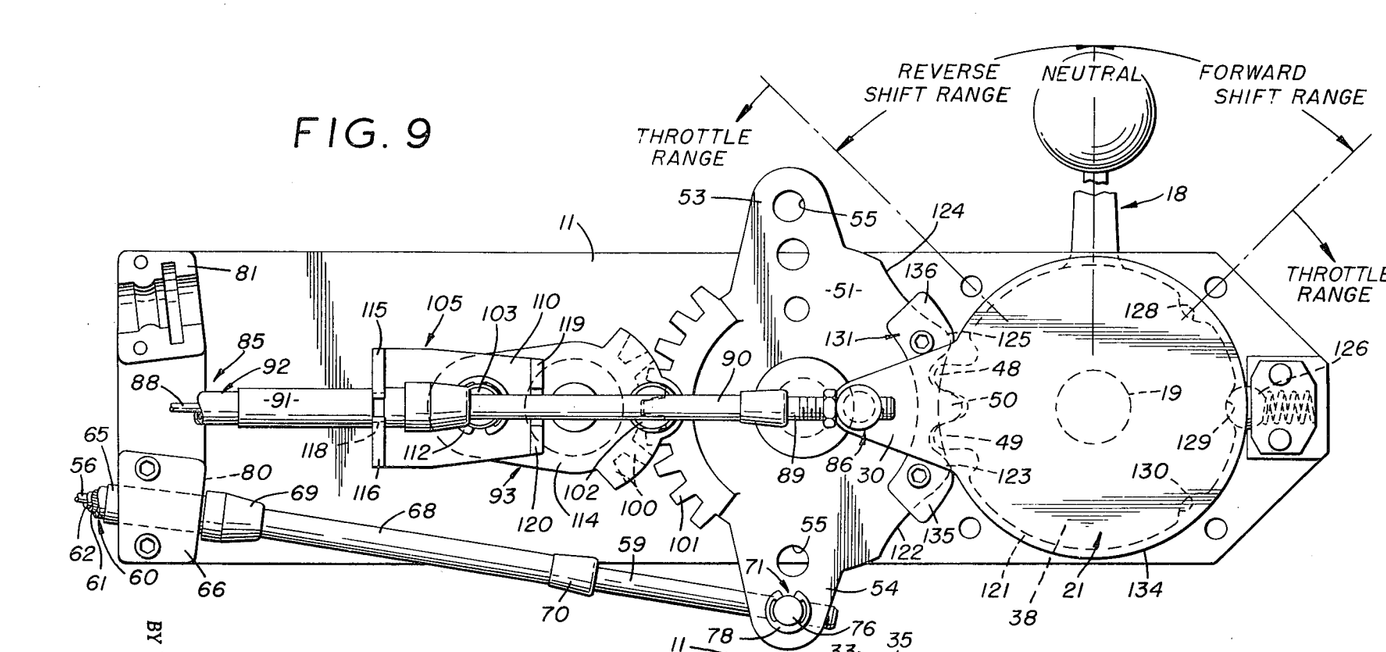
FIG. 9 is a view similar to FIG. 4 depicting the mechanism as oriented when the control lever is in neutral position except that the mechanism of the control unit is disposed to accept a first push-pull control cable for operating a pull-to-open throttle and a second push-pull control cable for operating a transmission in which the forward shift is affected by a pull.
Figure 10:
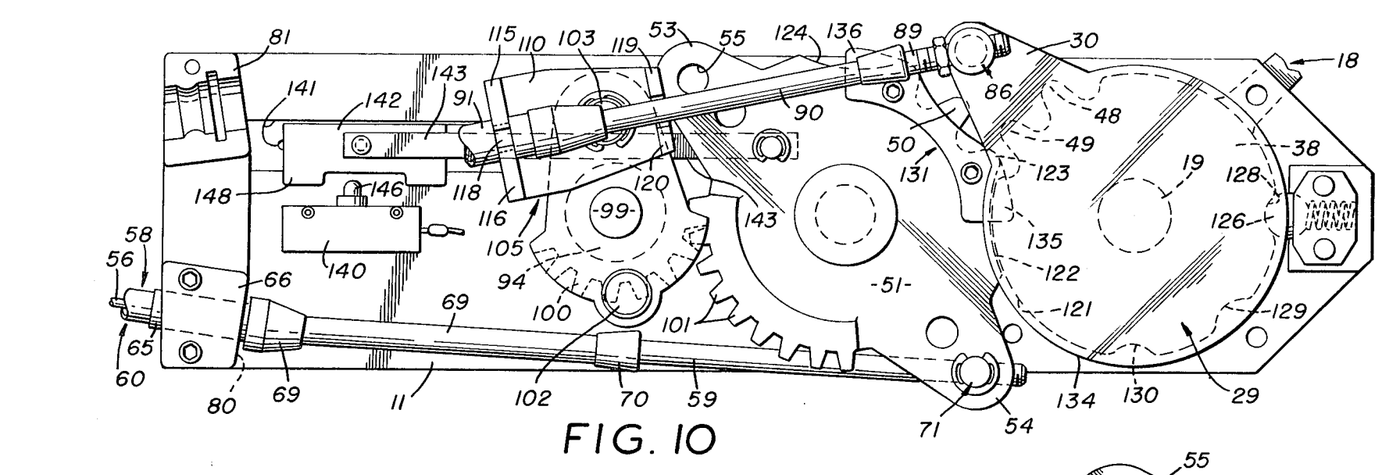
FIG. 10 is a view similar to FIG. 9 depicting the mechanism represented thereby as oriented when the control lever is in the idle forward position and further representing the inclusion of a neutral switch.
Figure 11:
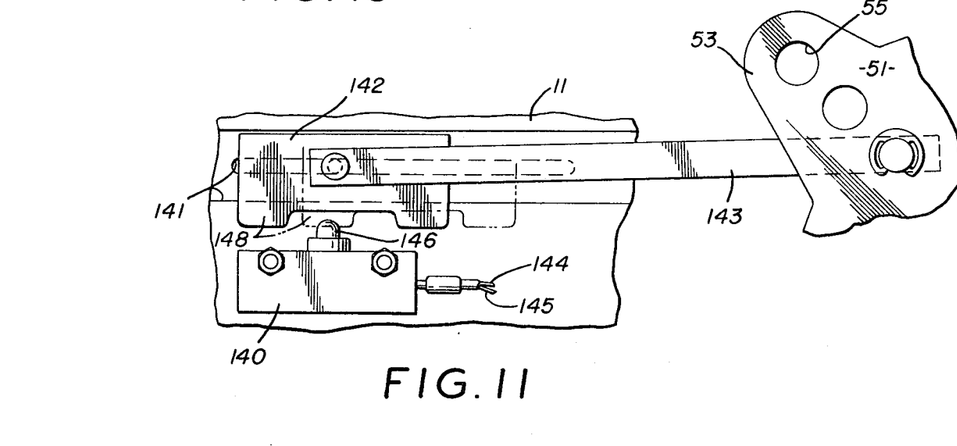
FIG. 11 is an enlarged partial area of FIG. 10 depicting, in full line, that orientation of the trip block with respect to the switch button occasioned when the control lever is not in neutral and that orientation, in chain line, of the same parts when the control lever is in neutral.

Here too, the push-pull transmission control cable 58 may be connected to the transmission actuation member 51 in accordance with the particular shift mechanism to be operated. As shown in FIGS. 9–11, the end rod 59 of cable 58 is connected to arm 54 in order to accommodate a transmission in which a "pull" shifts from neutral into forward.

An understanding of the operation of the control unit 10, as adapted for operation with a pull-to-open throttle, can, in view of the disclosure heretofore imparted, be readily appreciated and understood with a brief description of its operation through the forward shift range.

As the control lever 18 is rotated from the neutral position (FIG. 9) through the forward shift range to the idle forward position (FIG. 10) the drive hub 21 effects a rotation of the transmission actuation member 51 to "pull" end rod 59 and shift the remote transmission into forward.

Even though the throttle actuation member 29 is also being rotated with the control lever 18 as the latter is swung through the shift range, a throttle dwell is provided by the unique concept embodied in the subject control unit 10. The positioner block 93, though it rotates in exactly the same direction as shown with respect to operation of the control unit 10 when attached to a push-to-open throttle (compare the sequential representation depicted in FIGS. 4 and 6), nevertheless laterally changes the position of the end fitting 91 in an opposite direction to maintain the relative axial position of the end rod 89 with respect to the extension tube 90 so as to prevent axial displacement of the core 88 within casing 92.

To assure that the positioner block 93 moves the end fitting 91 in the same direction as, and along a curvilinear path that generally parallels, the curvilinear path followed by the trunnion connection 86 (which attaches the end rod 89 to the arm portion 30), the anchor clip 105 must be carried on stud 103 rather than stud 102. Only in this way will the positioner block 93 move the end fitting 91 along the required course. That is, the stud on which the anchor clip 105 is mounted must have the same locational relationship with respect to the pivotal axis 104 of the positioner block 93 as the connection of the end rod 89 and the arm portion 30 has to the pivotal axis 31 of the throttle actuation member 29—as shown in FIG. 9 both are to the left of their respective pivotal axes.

Irrespective of whether the subject control 10 is used with a push-to-open or a pull-to-open throttle, the throttle dwell provided is accomplished by a predetermined lateral displacement of the push-pull throttle control cable casing. It has been found that employment of this concept minimizes any tendency of the push-pull throttle control cable to bind because it has been overly bent—an undesirable tendency induced by some prior known single lever control units.

The subject control unit 10 also provides a neutral starting device—i.e., a mechanism that permits starting of the engine only when the transmission is in neutral position. As shown in FIGS. 10 and 11, a switch 140 is mounted on the chassis 11 adjacent a slideway 141 in which a trip block 142 is mounted for reciprocation. A link 143 is pivotally connected between the trip block 142 and the transmission actuation member 51 to move the trip block 142 along the slideway 141 in response to rotation of the transmission actuation member 51.

The switch 140 completes a circuit, through wires 144 and 145, to the starting device for the engine which permits the engine to be started only while the button 146 on switch 140 is depressed. Accordingly, a nub 148 on trip block 142 engages and maintains the button 146 depressed while the transmission actuation member 51 is in neutral (the chain-line representation in FIG. 11). However, as the transmission actuation member 51 rotates to shift the transmission into either forward or reverse, the nub 148 disengages from button 146 and the circuit through wires 144 and 145 is opened, thereby precluding operation of the engine statring device.

It should now be apparent that a control unit 10 embodying the concept of the present invention provides the operational and environmental characteristics desirable for a control of universal adaptability and otherwise accomplishes the objects of the invention.

I claim:

1. A single lever control unit for actuating at least the throttle of an engine by a push-pull throttle control cable having a core and casing, the cable being operatively connected to the engine throttle, said control unit also adapted sequentially to actuate a transmission, said control unit comprising, a chassis, a control lever movable through shift and throttle ranges from a neutral position, a throttle actuation member mounted on said chassis for selective rotation in response to movement of said control lever, throttle connecting means for attaching the core of said push-pull control cable to said throttle actuation member, a transmission actuation member operatively connected to said throttle actuation member to effect shifting of the transmission only during movement of said control lever through the shift range, a positioner means mounted on said chassis, securing means for attaching the throttle control cable casing to said positioner means, drive means to move said positioner means and displace said securing means generally parallel with said throttle connecting means only during movement of said control lever through the shift range to provide throttle dwell.

2. A single lever control unit, as set forth in claim 1, in which the positioner means is provided with a pair of spaced, stud means, the securing means being selectively attachable to either of said stud means, movement of said positioner means in response to said drive means displacing said spaced stud means in opposite directions so that by selective attachment of said securing means to said positioner means the securing means will be displaced generally parallel with said throttle connecting means to provide throttle dwell when the throttle actuation member is attached to a pull-to-open throttle as well as a push-to-open throttle.

3. A single lever control unit, as set forth in claim 1, in which the positioner means is rotatable about an axis, stud means on said positioner means located eccentrically with respect to said axis, said securing means being attached to said stud means selectively with respect to said axis.

4. A single lever control unit, as set forth in claim 1, in which the throttle actuation member is rotatable about a first axis and in which the positioner means is a block mounted on said chassis for selective rotation about a second axis.

5. A single lever control unit, as set forth in claim 4, in which the positioner block is provided with a pair of spaced stud means, one on each side of said second axis, the securing means being attached to the stud means located on that side of said second axis corresponding to that side of said first axis to which the throttle connecting means is attached to said throttle actuation member.

6. A single lever control unit, as set forth in claim 5, in which the securing means is pivotally mounted on the selected stud means.

7. A single lever control unit, as set forth in claim 6, in which the drive means is connected between said positioner block and said transmission actuation member.

8. A single lever control unit, as set forth in claim 7, in which the drive means comprises a gear segment on said positioner block intermeshed with a gear segment on said transmission actuation member.

9. A single lever control, as set forth in claim 8, having a neutral switch means mounted on said chassis, a trip block movable between at least a first and second position to make and break a circuit through said switch means and link means to move said trip block between said first and second positions at least during the first portion of rotation of said control lever from neutral.

10. A single lever control unit, as set forth in claim 9, in which the throttle actuation member is mounted on one end of a control shaft, the control lever being mounted on the other end of said control shaft, a drive hub rotatably mounted on said control shaft and having tooth means engaging similar tooth means on said transmission control member, interconnecting means selectively joining said control shaft to said drive hub, rotation of said control lever with the control hub joined to said control shaft effecting sequential transmission and throttle control and rotation of said control lever with said interconnecting means maintaining said control hub and control shaft disjoined effecting neutral throttle.

11. A single lever control unit, as set forth in claim 10, in which said interconnecting means permits said control shaft to be rotated 180° with respect to said control hub to permit selective disposition of said throttle actuation member for adaptation to push-to-open and pull-to-open throttles.

References Cited

UNITED STATES PATENTS

| | | | |
|---|---|---|---|
| 2,949,988 | 8/1960 | Morse | 74—875 X |
| 2,966,969 | 1/1961 | Morse | 74—875 X |
| 2,971,618 | 2/1961 | Morse | 74—876 X |
| 2,987,152 | 6/1961 | Morse | 74—876 X |
| 3,150,050 | 12/1963 | Marr | 74—976 |
| 3,301,084 | 1/1967 | Boda | 74—876 |

DONLEY J. STOCKING, Primary Examiner

T. C. PERRY, Assistant Examiner

U.S. Cl. X.R.

74—878; 192—.098